US008959236B2

(12) United States Patent
Tachibana

(10) Patent No.: US 8,959,236 B2
(45) Date of Patent: Feb. 17, 2015

(54) COMMUNICATION SYSTEM AND METHOD FOR EXECUTING A SETTING PROCESS REGARDLESS OF WHETHER A SETTING METHOD REQUIRES SWITCHING OF NETWORKS

(75) Inventor: Hideaki Tachibana, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 266 days.

(21) Appl. No.: 13/131,581

(22) PCT Filed: Dec. 7, 2009

(86) PCT No.: PCT/JP2009/006664
§ 371 (c)(1),
(2), (4) Date: May 26, 2011

(87) PCT Pub. No.: WO2010/067573
PCT Pub. Date: Jun. 17, 2010

(65) Prior Publication Data
US 2011/0238848 A1    Sep. 29, 2011

(30) Foreign Application Priority Data

Dec. 11, 2008    (JP) .................................. 2008-316041

(51) Int. Cl.
*G06F 15/16*    (2006.01)
*H04W 28/18*    (2009.01)
(Continued)

(52) U.S. Cl.
CPC .............. *H04W 28/18* (2013.01); *H04W 84/18* (2013.01)
USPC ........... 709/228; 709/227; 370/252; 370/254; 370/329

(58) Field of Classification Search
CPC ..... H04W 24/02; H04W 28/18; H04W 48/16; H04W 84/12; H04W 84/18

USPC .......... 709/227–228; 713/168, 171; 370/252, 370/254, 329
See application file for complete search history.

(56) References Cited

U.S. PATENT DOCUMENTS 8,166,166 B2 *    4/2012    Arroyo et al. ................. 709/226
8,472,343 B2 *    6/2013    Johnsson et al. .............. 370/254
(Continued)

FOREIGN PATENT DOCUMENTS

JP    2000-339247 A    12/2000
JP    2007-081579 A    3/2007
(Continued)

OTHER PUBLICATIONS

U.S. Appl. No. 13/061,124, filed Feb. 25, 2011.
(Continued)

*Primary Examiner* — Alina N Boutah
(74) *Attorney, Agent, or Firm* — Carter, DeLuca, Farrell & Schmidt, LLP

(57) ABSTRACT

A printer is presented including a transmission unit configured to transmit a response signal in response to a probe request signal transmitted from an external communication device, a determination unit configured to determine a communication parameter setting method, and a selection unit configured to select a communication parameter setting method executable by both the printer and the external communication device. The printer further includes an execution unit configured to, in a case where the communication parameter setting method requires participation in a predetermined network newly established by a device, participate in the predetermined network and execute communication parameter setting processing according to the communication parameter setting method, and in a case where the communication parameter setting method does not require participation in the predetermined network newly established by the device, execute the communication parameter setting processing according to the communication parameter setting method without participating in the predetermined network.

9 Claims, 4 Drawing Sheets

(51) Int. Cl.
*H04L 1/00* (2006.01)
*H04W 84/18* (2009.01)

(56) References Cited

U.S. PATENT DOCUMENTS

| | | | |
|---|---|---|---|
| 8,472,629 B2* | 6/2013 | Hamachi | 380/278 |
| 2002/0147819 A1* | 10/2002 | Miyakoshi et al. | 709/228 |
| 2004/0133689 A1* | 7/2004 | Vasisht | 709/228 |
| 2005/0048953 A1* | 3/2005 | Ohara | 455/412.1 |
| 2005/0088980 A1* | 4/2005 | Olkkonen et al. | 370/255 |
| 2006/0165133 A1* | 7/2006 | Yokota et al. | 372/6 |
| 2006/0200564 A1* | 9/2006 | Watanabe et al. | 709/227 |
| 2006/0215576 A1* | 9/2006 | Yu et al. | 370/252 |
| 2006/0282541 A1* | 12/2006 | Hiroki | 709/228 |
| 2007/0060213 A1* | 3/2007 | Yoshida | 455/574 |
| 2007/0088951 A1* | 4/2007 | Nakajima | 713/171 |
| 2007/0120955 A1* | 5/2007 | Shimosato | 348/14.01 |
| 2008/0147868 A1* | 6/2008 | Dawidowsky et al. | 709/227 |
| 2009/0028341 A1* | 1/2009 | Hamachi | 380/278 |
| 2010/0046394 A1* | 2/2010 | Fujii et al. | 370/254 |
| 2010/0182956 A1* | 7/2010 | Moritomo et al. | 370/328 |
| 2010/0203825 A1* | 8/2010 | Goto | 455/7 |
| 2010/0220605 A1* | 9/2010 | Fujii | 370/252 |
| 2010/0228868 A1* | 9/2010 | Sakai | 709/228 |
| 2010/0234056 A1* | 9/2010 | Goto | 455/515 |
| 2010/0322164 A1* | 12/2010 | Sakai | 370/329 |
| 2010/0332666 A1* | 12/2010 | Hamachi | 709/228 |
| 2011/0261892 A1* | 10/2011 | Fujii | 375/259 |

FOREIGN PATENT DOCUMENTS

| | | |
|---|---|---|
| WO | 2004/008793 A1 | 1/2004 |
| WO | 2005/107285 A1 | 11/2005 |

OTHER PUBLICATIONS

U.S. Appl. No. 13/125,952, filed Apr. 25, 2011.
U.S. Appl. No. 13/124,203, filed Apr. 14, 2011.
U.S. Appl. No. 13/122,619, filed Apr. 5, 2011.
U.S. Appl. No. 13/122,558, filed Apr. 4, 2011.
U.S. Appl. No. 13/120,535, filed Mar. 23, 2011.

* cited by examiner

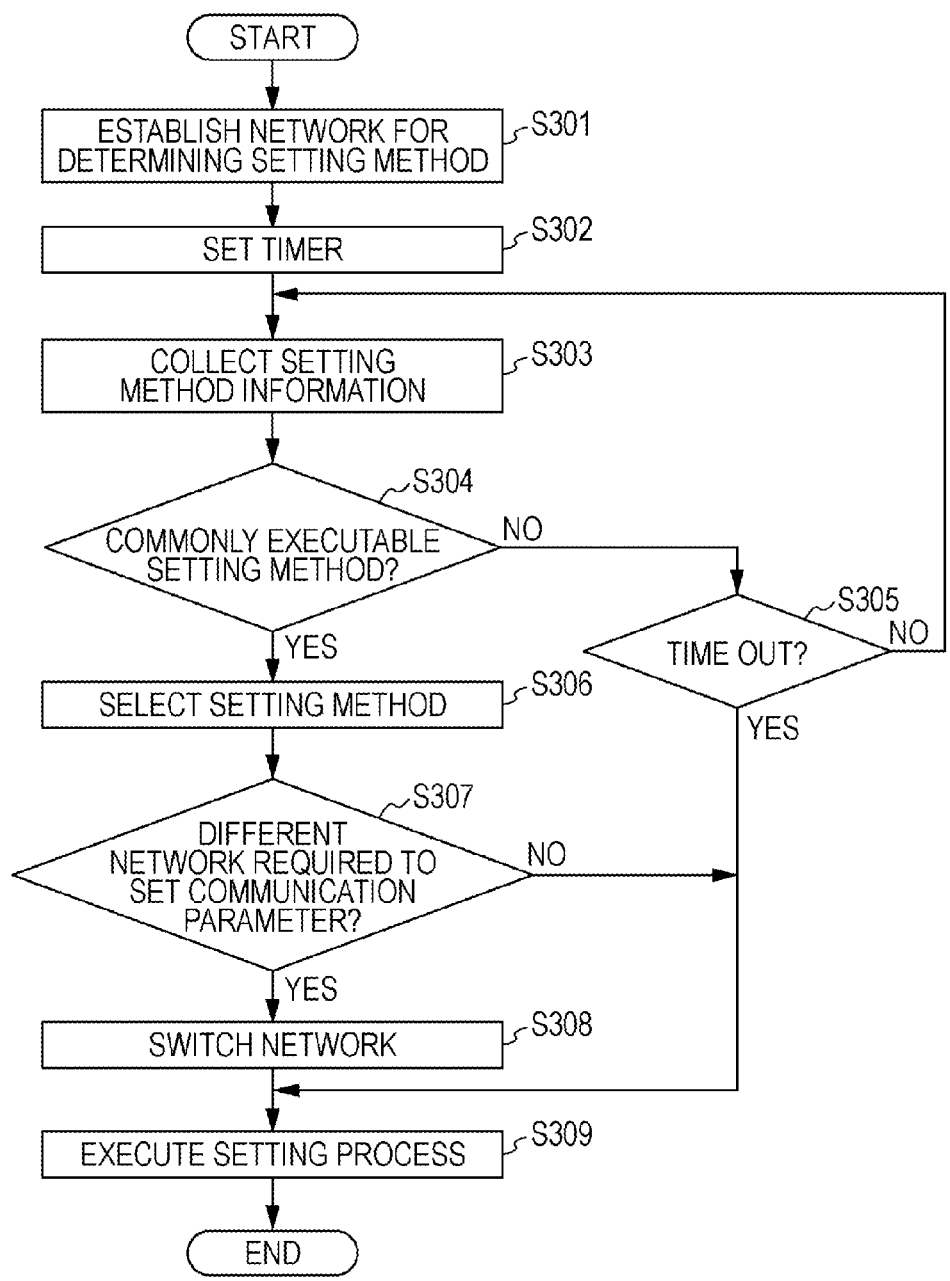

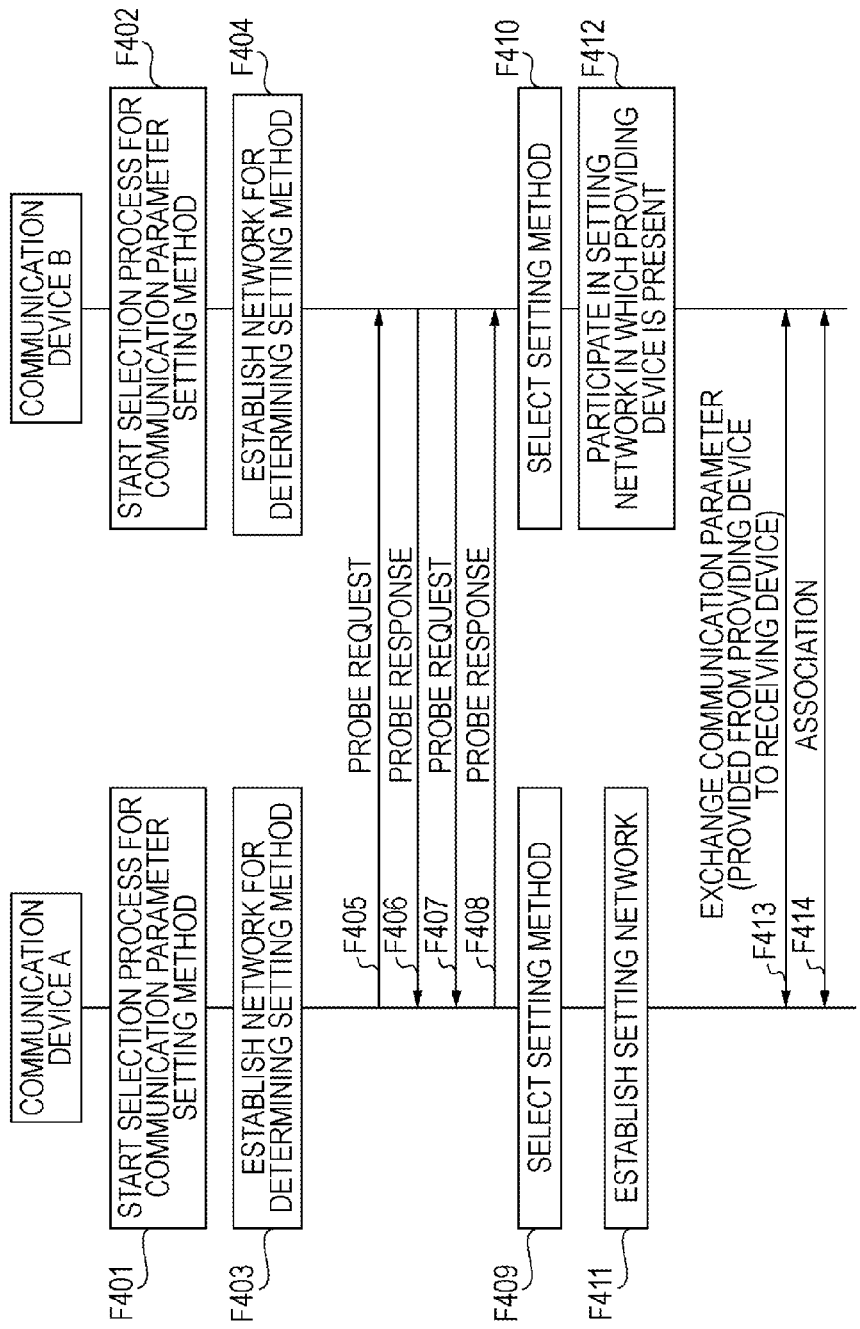

COMMUNICATION SYSTEM AND METHOD FOR EXECUTING A SETTING PROCESS REGARDLESS OF WHETHER A SETTING METHOD REQUIRES SWITCHING OF NETWORKS

TECHNICAL FIELD

The present invention relates to a communication device, a control method therefor, and a computer program which allow communication devices to perform a communication parameter setting process.

BACKGROUND ART

In wireless communication, the setting of a large number of setting items before use involves time-consuming processes. In wireless communication such as in wireless local area networks (LANs) based on the Institute of Electrical and Electronics Engineers (IEEE) 802.11 series of standards, for example, the setting items include a service set identifier (SSID) serving as a network identifier (ID), an encryption method, an encryption key, an authentication method, and an authentication key. Many manufacturers have developed mechanisms for facilitating the setting of communication parameters. The standard therefor is Wi-Fi Protected Setup (WPS), which was created by the Wi-Fi Alliance.

Since the communication parameter setting methods (hereinafter referred to as "setting methods") are executed using unique protocols, different types of setting methods are not compatible with each other. Thus, the setting of parameters in a wireless communication device that supports a plurality of setting methods requires that users implement the same setting method on both a providing device that provides communication parameters and a receiving device that receives the communication parameters from the providing device. In a method for improving user usability, a receiving device that receives communication parameters from a providing device automatically selects a setting method provided by the providing device (hereinafter referred to as a "setting method selection method"). The setting method selection method is performed in infrastructure communication that uses an access point.

In PTL 1, a network ID is assigned for each setting method, and an access point establishes a network using a network ID for a setting method to be implemented. Wireless communication devices automatically set communication parameters using the method corresponding to the network ID.

In an ad-hoc network where wireless communication devices directly communicate with one another, there is no wireless communication device that manages the network. Therefore, it is difficult for each wireless communication device to have accurate knowledge of information about communication parameter setting methods with which the other devices are compatible or the number of wireless communication devices in the network. In the setting of communication parameters in the ad-hoc mode, therefore, it is difficult to judge which communication parameter setting method is to be automatically selected and executed. Since it is difficult to automatically select the communication parameter setting method to be executed, it is also difficult to judge the network on which the communication parameter setting operation is performed.

Furthermore, since each setting method requires a different setting process, even if a setting method can be selected, the correct setting process may not necessarily be performed. For example, some setting methods require that setting processes be executed on setting networks dedicated to the setting processes, and other setting methods do not. When a setting network is used, each device needs to join the network, whereas when no setting network is used, the switching of networks is not required. In other words, the switching of networks may or may not be required depending on which setting method is to be executed. In addition, devices that are not in the same network cannot perform the setting process.

CITATION LIST

Patent Literature

PTL 1: US 2007/0088951A (Japanese Patent Laid-Open No. 2007-143117)

SUMMARY OF INVENTION

The present invention provides a solution to the difficulties involved when a plurality of setting methods for setting communication parameters are usable. Accordingly, for example, a setting method commonly executable by devices that execute a setting process can be selected. Further, a setting process can be executed regardless of whether or not the selected setting method requires the switching of networks.

In an aspect, the present invention provides a first communication device including a determination means for determining communication parameter setting methods executable by a second communication device; a selection means for selecting a setting method executable by both the first communication device and the second communication device from among the setting methods determined by the determination means; a judgment means for judging whether or not switching to a setting network for executing a communication parameter setting process is required to execute a communication parameter setting process using the setting method selected by the selection means; and an execution means for switching to the setting network in accordance with a judgment result of the judgment means and to execute a communication parameter setting process.

BRIEF DESCRIPTION OF DRAWINGS

FIG. 3 is a flowchart of the first embodiment.
FIG. 4 is a sequence diagram of the first embodiment.

DESCRIPTION OF EMBODIMENTS

First Embodiment

First, a hardware configuration according to an embodiment of the present invention will be described.

A wireless communication device according to the present embodiment will now be described in detail with reference to the drawings. While the description will be given in the context of a wireless LAN system based on the IEEE 802.11 series of standards by way of example, communication systems other than IEEE 802.11 based wireless LAN systems may be used.

Figure 1:
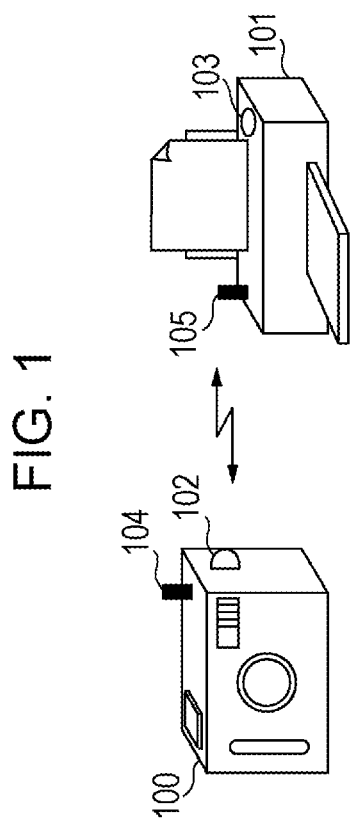
FIG. 1 is a block diagram of a first embodiment.

Referring to FIG. 1, wireless communication devices 100 and 101 may be, in the present embodiment, a digital camera (communication device A) and a printer (communication device B), respectively. The communication device A corresponds to a first communication device, and has a communication function 104 that provides an implementation of a wireless LAN. The communication device A further has an execute button 102 for automatically selecting a communication parameter setting method for a wireless network and automatically setting communication parameters using the selected method. When the execute button 102 is pressed, a network for collecting information about peripheral wireless communication devices and a network for setting communication parameters can be created.

The communication device B corresponds to a second communication device, and also has a wireless communication function 105 that provides an implementation of a wireless LAN. The communication device B further has an execute button 103 for automatically selecting a setting method and automatically setting communication parameters using the selected method. When the execute button 103 is pressed, a network for collecting information about peripheral wireless communication devices and a network for setting communication parameters can be created. In the present embodiment, the communication devices A and B are capable of executing a plurality of communication parameter setting methods.

The communication device A is capable of executing a communication parameter setting method A that is designed to set communication parameters for each wireless communication device, and a communication parameter setting method B that is designed to collectively set communication parameters for a plurality of wireless communication devices. The communication device B is capable of executing the communication parameter setting method A, which is similar to that of the communication device A, and a communication parameter setting method C that is designed to collectively set communication parameters. Note that the methods B and C are different from each other although they may achieve the same or similar advantages.

The communication parameter setting method A is also a method that requires the establishment of a network for setting communication parameters when communication parameters are set in order to set the communication parameters. Each of the above setting methods may be a communication protocol for providing communication parameters including a network identifier, an encryption method, an encryption key, an authentication method, and an authentication key from one device to another device so that the individual devices can share the common communication parameters.

Figure 2:
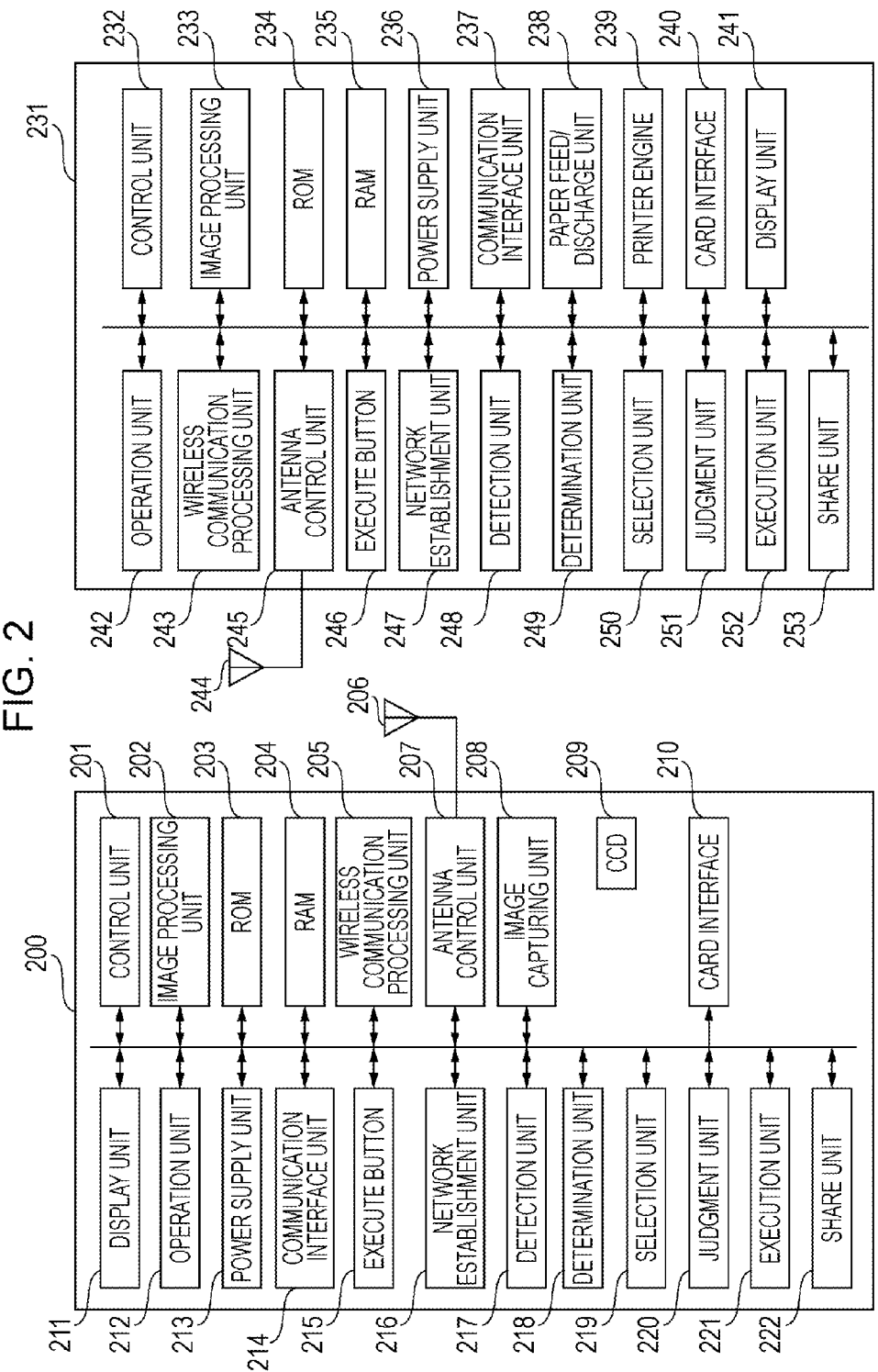
FIG. 2 is a block diagram of a device according to the first embodiment.

FIG. 2 is a block diagram of the communication devices A and B. In FIG. 2, the communication device A may be a digital camera 200. The digital camera 200 includes a control unit 201 that controls the digital camera 200, an image processing unit 202, a read only memory (ROM) 203 that stores control commands, that is, programs, and a random access memory (RAM) 204. The digital camera 200 further includes a wireless communication processing unit 205 that controls communication over a wireless LAN (based on IEEE 802.11), an antenna 206, and an antenna control unit 207. The digital camera 200 further includes an image-capturing unit 208 that captures a pixel signal input from a charge-coupled device (CCD) sensor 209, a card interface 210 configured to control a recording medium card that stores captured images and setting information, a display unit 211, and an operation unit 212. When a user operates the operation unit 212, various operations such as giving a photographing instruction, reproduction, and setting are performed.

The digital camera 200 further includes a power supply unit 213, a communication interface unit 214, an execute button 215, and a network establishment unit 216. The communication interface unit 214 may be a non-wireless communication interface such as a universal serial bus (USB) or IEEE 1394 interface. The execute button 215 corresponds to the execute button 102 illustrated in FIG. 1, and is used for selecting a communication parameter setting method and automatically setting communication parameters using the selected method. When the user presses the execute button 215, a mode for selecting a communication parameter setting method and automatically setting communication parameters using the selected method is started. The network establishment unit 216 establishes a network for collecting information about a peripheral wireless communication device and selecting a setting method, a network for setting communication parameters, and a network for performing data communication.

The digital camera 200 further includes a detection unit 217, a determination unit 218, a selection unit 219, a judgment unit 220, an execution unit 221, and a share unit 222. The detection unit 217 detects exchanged communication packets and network ID information. The determination unit 218 determines communication parameter setting methods executable by the peripheral device on the basis of a detection result of the detection unit 217. The selection unit 219 determines setting methods commonly executable by the digital camera 200 and the peripheral device on the basis of determination results of the determination unit 218, and selects one of the setting methods. The judgment unit 220 judges whether or not the setting method selected by the selection unit 219 requires the establishment of a setting network for setting communication parameters, and also judges whether or not the selected setting method requires the switching to the setting network to automatically set communication parameters. The execution unit 221 executes a process of automatically setting communication parameters using the selected setting method on the basis of a judgment result of the judgment unit 220. The share unit 222 stores communication parameters that are shared with the other device by performing the process of automatically setting communication parameters.

The communication device B may be a printer 231. The printer 231 includes a control unit 232 that controls the printer 231, an image processing unit 233, a ROM 234 that stores control commands, that is, programs, a RAM 235, a power supply unit 236, and a communication interface unit 237. The communication interface unit 237 may be a non-wireless communication interface such as a USB or IEEE 1394 interface. The printer 231 further includes a paper feed/discharge unit 238 that feeds and discharges print sheets, a printer engine 239 that controls the printer 231 to perform printing, a card interface 240 configured to control a recording medium card that stores images, a display unit 241, and an operation unit 242. The printer 231 further includes a wireless communication processing unit 243 that controls communication over a wireless LAN (based on IEEE 802.11), an antenna 244, and an antenna control unit 245.

The printer 231 further includes an execute button 246, a network establishment unit 247, a detection unit 248, a determination unit 249, a selection unit 250, a judgment unit 251, an execution unit 252, and a share unit 253. The execute button 246 corresponds to the execute button 103 illustrated in FIG. 1, and is used for selecting a communication parameter setting method and automatically setting communication parameters using the selected method. When the execute button 246 is pressed, a mode for selecting a communication parameter setting method and automatically setting communication parameters using the selected method is started. The network establishment unit 247 establishes a network for collecting information about a peripheral wireless communication device and selecting a setting method, a network for setting communication parameters, and a network for performing data communication. The detection unit 248 detects exchanged communication packets and network ID information. The determination unit 249 determines communication parameter setting methods executable by the peripheral device on the basis of a detection result of the detection unit 248. The selection unit 250 determines setting methods commonly executable by the printer 231 and the peripheral device on the basis of determination results of the determination unit 249, and selects one of the setting methods. The judgment unit 251 judges, based on the detection result of the detection unit 248, which setting method can be used to execute the setting and whether or not the establishment of a network for setting communication parameters is required. The execution unit 252 executes a process of automatically setting communication parameters using the selected setting method on the basis of a judgment result of the judgment unit 251. The share unit 253 stores communication parameters that are shared with the other device by performing the process of automatically setting communication parameters.

The above configuration is merely an example of an embodiment of the present invention, and any other configuration may be used.

In the first embodiment, description will be given of a process up to the setup of an ad-hoc connection between the communication devices A and B. In this process, a network for determining a communication parameter setting method is established, information about communication parameter setting methods supported by peripheral wireless communication devices is collected, and a communication parameter setting method to be executed is determined. In addition, the communication parameter setting method to be executed is referenced to judge the network on which the communication parameter setting operation is performed, and it is determined whether or not the switching of networks is performed.

FIG. 3 is a flowchart illustrating the operation process of the communication device A and/or the communication device B according to the first embodiment. In the communication device A and/or the communication device B (hereinafter referred to as the "communication device"), when the execute button 215 (246) is operated, the process illustrated in FIG. 3 is started. The process illustrated in FIG. 3 may be automatically started when the communication device is powered on.

When the process is started, the communication device establishes a selection network for selecting a communication parameter setting method, and participates in the network (step S301). The selection network is established by the network establishment unit 216 (247). The communication device establishes an ad-hoc network as a selection network using a unique network ID. The use of a network ID unique to each device can avoid redundancy with a network established by a peripheral wireless communication device.

This ensures that the communication device can return a response to a search signal transmitted from the peripheral wireless communication device, such as a probe request, to enable the other device to detect the presence of the communication device. The selection network may be established using a predetermined network ID that is common to the respective devices to create an ad-hoc network. Once devices participate in a common network, each of the devices can search for another device only by searching through the network in which this device is participating. Thus, the switching of networks is not required to search for another device.

When a selection network is established, the control unit 201 (232) of the communication device determines a period for which a process of determining a communication parameter setting method is performed, and sets a timer for the period (step S302). The detection unit 217 (248) of the communication device scans the wireless LAN to obtain information about communication parameter setting methods executable by the peripheral wireless communication device and basic device information about the peripheral wireless communication device (step S303). In the scanning of the wireless LAN, the communication device transmits a probe request that is a search request signal. The communication device that has received the probe request transmits a probe response as a response signal which contains information about communication parameter setting methods executable thereby (hereinafter referred to as "setting method information") and basic device information.

Upon receipt of the response, the communication device collects the setting method information and the basic device information about the peripheral wireless communication device. The setting method information includes information indicating communication parameter setting methods supported by the peripheral wireless communication device. When a communication parameter setting process is in progress, information indicating that a communication parameter setting process is in progress is also contained. Basic device information may be information unique to each communication device, and may contain, for example, a media access control (MAC) address. While in the first embodiment, the information is contained in a probe request and a probe response, the information may be transmitted and received using other messages.

The determination unit 218 (249) of the communication device analyzes the collected information, and determines setting methods executable by the peripheral wireless communication device. Then, the selection unit 219 (250) of the communication device judges whether or not a setting method commonly executable by the communication device and the peripheral wireless communication device is included (step S304). If it is determined in step S304 that no setting methods commonly executable by the communication device and the peripheral wireless communication device are included, the communication device judges whether or not the timer set in step S302 has expired (step S305). If the timer has expired, the setting method determination process ends. If the timer has not expired, the process returns to step S303.

If it is determined in step S304 that setting method or methods commonly executable by the communication device and the peripheral wireless communication device are included, the selection unit 219 (250) of the communication device selects a setting method to be executed from among the commonly executable setting method or methods (step S306).

In step S306, if there are a plurality of commonly executable setting methods, the communication device may preferentially select a setting method that is currently being executed by the peripheral wireless communication device. If no setting method is being currently executed by the peripheral wireless communication device, a setting method may be selected in accordance with predetermined priorities. For example, a high priority may be assigned to a setting method having a high level of security, or a high priority may be assigned to a setting method that allows a high-speed setting process. Alternatively, a high priority may be assigned to a setting method that is most widely supported by peripheral wireless communication devices. Which of the above priority methods is to be employed is determined in advance.

The judgment unit 220 (251) of the communication device judges whether or not the setting method selected in step S306 is a method that requires that the setting process be performed on a network different from the network established in step S301 (step S307). Examples of the different network include a network that is unique to a communication parameter setting method, on which the setting process is required to be performed, and a network established by a providing device that provides communication parameters, in which a device that receives the communication parameters (from the providing device) participates. If the selected setting method is a setting method that requires the establishment of a different network to perform the setting process, the execution unit 221 (252) of the communication device performs switching to a network for setting communication parameters (step S308).

If the selected setting method is not a setting method that requires the establishment of a different network to perform the setting process, the execution unit 221 (252) of the communication device remains the current network unchanged without switching to another network, and the process proceeds to step S309. In the present embodiment, in a setting method that requires the switching to a setting network for setting communication parameters, the setting network is established by a providing device that provides communication parameters. In addition, a receiving device that receives the communication parameters from the providing device participates in the setting network established by the providing device in order to receive the communication parameters. It is assumed that a setting network is a network unique to a setting method and is a network associated with a unique network ID (network identification information). Since a setting network is a network unique to a setting method, a receiving device can easily search for a network in which the receiving device is to participate.

Then, the execution unit 221 (252) of the communication device executes a communication parameter setting process to share communication parameters, and stores the communication parameters in the share unit 222 (253) (step S309). Later, when the communication devices A and B communicate with each other via wireless transmission, the communication devices A and B participate in a network using the communication parameters stored in the share units 222 and 253 so that they can communicated with each other. In the present embodiment, after step S309, the communication devices A and B automatically participate in a network using the communication parameters stored in the share units 222 and 253 so that they can communicate with each other.

FIG. 4 is a diagram illustrating a sequence according to the first embodiment.

In the first embodiment, first, the communication devices A and B start a selection process for a communication parameter setting method (F401, F402). The selection process may be started when the execute buttons 215 and 246 are operated. When the selection process is started, the communication devices A and B establish a selection wireless network for selecting a communication parameter setting method (F403, F404). Next, the communication device A transmits a probe request for obtaining setting method information and basic device information about a peripheral wireless communication device (the communication device B) (F405). In response to the probe request from the communication device A, the communication device B returns a probe response (F406). The probe response includes setting method information and basic device information about the communication device B. In the first embodiment, the probe response contains information indicating that the communication device B supports the setting methods A and C.

The communication device B further transmits a probe request for obtaining setting method information and basic device information about a peripheral wireless communication device (the communication device A) (F407). In response to the probe request from the communication device B, the communication device A returns a probe response (F408). The probe response includes setting method information and basic device information about the communication device A. In the first embodiment, the probe response contains information indicating that the communication device A supports the setting methods A and B. The communication devices A and B collect the setting method information, and therefore select a commonly executable setting method (i.e., the setting method A) (F409, F410).

In the first embodiment, it is assumed that the communication device A is a providing device that provides communication parameters. It is also assumed that the communication device B is a receiving device that receives the communication parameters from the providing device. Further, it is assumed that the selected setting method A is a method that requires that the communication parameter setting process be performed on a network different from the current network (selection network). Therefore, the communication device A serving as a providing device establishes a second network (setting network) for performing a communication parameter setting process (F411).

The communication device B serving as a receiving device exits the current network and participates in the network in which the providing device (i.e., the communication device A) is present (F412). That is, the communication device B participates in the setting network established by the communication device A. The communication devices A and B execute a communication parameter setting process, and exchange communication parameters (namely, the providing device provides communication parameters to the receiving device) (F413). After the completion of the setting process, the communication devices A and B perform a connection process using the communication parameters exchanged by executing the setting process (F414). While in the first embodiment, the description has been given in the context of two communication devices, a similar sequence may be used for more than two communication devices.

Accordingly, each of wireless communication devices is capable of identifying information about communication parameter setting methods supported by the other wireless communication devices. Thus, even in an ad-hoc network, it can be determined which communication parameter setting method is to be executed. Further, it can be judged on which network the communication parameter setting operation is to be performed by judging the communication parameter setting method to be executed.

Furthermore, even if a plurality of setting methods are executable, a commonly executable method is selected, and it is judged whether or not the selected method is a method that requires the establishment of a different network (setting network) to perform a setting process. If the selected method is a method that requires the establishment of a setting network, a setting network is established, and devices participate in the setting network and perform a setting process. If the selected method is a method that does not require the establishment of a setting network, devices perform a setting process on the selection network. This ensures that communication parameters can be set in accordance with a variety of setting methods.

That is, the difficulties involved when a plurality of setting methods for setting communication parameters are usable can be overcome. For example, a setting method commonly executable by devices that execute a setting process can be selected. Furthermore, regardless of whether or not the selected setting method is a method that requires the switching of networks, the setting process can be executed.

The foregoing description has been given in the context of an IEEE 802.11 based wireless LAN, by way of example. However, the present invention may also be implemented using other wireless media such as wireless USB, Multi Band Orthogonal Frequency Division Multiplexing (OFDM) Alliance (MBOA), Bluetooth (registered trademark), Ultra Wide Band (UWB), and ZigBee. The present invention may also be implemented using wired communication media such as a wired LAN.

UWB includes wireless USB, wireless 1394, and WiMedia Network (WiNET).

Furthermore, the communication parameters include a network identifier, an encryption method, an encryption key, an authentication method, and an authentication key, by way of example. However, it is to be understood that other information may be used and other information may be included in communication parameters.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-316041, filed Dec. 11, 2008, which is hereby incorporated by reference herein in its entirety.

The invention claimed is:

1. A communication apparatus comprising:
a transmission unit configured to transmit a response signal in response to a probe request signal transmitted from another communication apparatus;
an obtaining unit configured to obtain information of a communication parameter setting method which is executable by an external communication device;
a selection unit configured to select a communication parameter setting method executable by both the communication apparatus and the external communication device based on the obtained information; and
an execution unit configured to,
1) in a case where the selected communication parameter setting method requires participation in a setting network, that is newly established by a device which provides a communication parameter, for setting a communication parameter, participate in the setting network and execute a communication parameter setting process according to the selected communication parameter setting method, and
2) in a case where the selected communication parameter setting method does not require participation in the setting network, execute a communication parameter setting process according to the selected communication parameter setting method without participating in the setting network.

2. The communication apparatus according to claim 1, wherein the obtaining unit obtains the information from the external communication device by receiving a response signal in response to a probe request signal from the communication apparatus.

3. The communication apparatus according to claim 1, wherein the setting network is unique to the selected communication parameter setting method.

4. The communication apparatus according to claim 1, wherein, in a case where there are plural communication parameter setting methods executable by both the communication apparatus and the external communication device, the selection unit selects one of the communication parameter setting methods based on preset priority.

5. The communication apparatus according to claim 1, wherein, in a case where there are plural communication parameter setting methods executable by both the communication apparatus and the external communication device, the selection unit selects a communication parameter setting method that is being executed.

6. The communication apparatus according to claim 1, wherein, in a case where there are plural communication parameter setting methods executable by both the communication apparatus and the external communication device, the selection unit selects a communication parameter setting method based on a security level.

7. The communication apparatus according to claim 1, wherein the execution unit executes a process for setting a communication parameter for performing wireless communication with the external communication device based on the Institute of Electrical and Electronics Engineers 802.11 series of standards.

8. A method comprising:
transmitting a response signal in response to a probe request signal transmitted from another communication apparatus;
obtaining information of a communication parameter setting method which is executable by an external communication device;
selecting a communication parameter setting method executable by both a communication apparatus and the external communication device based on the obtained information;
participating in a setting network, that is newly established by a device which provides a communication parameter for setting a communication parameter, and executing a communication parameter setting process according to the selected communication parameter setting method, in a case where the selected communication parameter setting method requires participation in the setting network; and
executing a communication parameter setting process according to the selected communication parameter setting method without participating in the setting network in a case where the selected communication parameter setting method does not require participation in the setting network.

9. A non-transitory storage medium storing a program which causes a processor to perform a method comprising:
- transmitting a response signal in response to a probe request signal transmitted from another communication apparatus;
- obtaining information of a communication parameter setting method which is executable by an external communication device;
- selecting a communication parameter setting method executable by both a communication apparatus and the external communication device based on the obtained information;
- participating in a setting network, that is newly established by a device which provides a communication parameter for setting a communication parameter, and executing a communication parameter setting process according to the selected communication parameter setting method, in a case where the selected communication parameter setting method requires participation in the setting network; and
- executing a communication parameter setting process according to the selected communication parameter setting method without participating in the setting network in a case where the selected communication parameter setting method does not require participation in the setting network.

* * * * *